US011964736B2

(12) United States Patent
Robertson et al.

(10) Patent No.: US 11,964,736 B2
(45) Date of Patent: Apr. 23, 2024

(54) THROUGH-HULL LIGHT

(71) Applicant: Ocean LED Marine Limited, Hinckley (GB)

(72) Inventors: Toby Robertson, Hinckley (GB); Daniele Todaro, Hinckley (GB); Umberto Bizzaro, Hinckley (GB)

(73) Assignee: Ocean LED Marine Limited, Hinckley (GB)

( * ) Notice: Subject to any disclaimer, the term of this patent is extended or adjusted under 35 U.S.C. 154(b) by 0 days.

(21) Appl. No.: 18/187,263

(22) Filed: Mar. 21, 2023

(65) Prior Publication Data

US 2023/0294801 A1 Sep. 21, 2023

(30) Foreign Application Priority Data

Mar. 21, 2022 (GB) ..................................... 2203939

(51) Int. Cl.

*B63B 45/02* (2006.01)
*F21V 7/00* (2006.01)
*F21W 107/20* (2018.01)
*F21Y 115/10* (2016.01)

(52) U.S. Cl.

CPC ............ *B63B 45/02* (2013.01); *F21V 7/0083* (2013.01); *F21W 2107/20* (2018.01); *F21Y 2115/10* (2016.08)

(58) Field of Classification Search

CPC .... B63B 45/02; F21V 7/0083; F21W 2107/20
See application file for complete search history.

(56) References Cited

U.S. PATENT DOCUMENTS

| | | | | |
|---|---|---|---|---|
| 8,172,434 | B1 * | 5/2012 | Olsson | F21V 29/58 362/249.02 |
| 9,903,561 | B1 * | 2/2018 | Chen | F21S 8/00 |
| 2005/0111222 | A1 | 5/2005 | Olsson et al. | |
| 2007/0139913 | A1 * | 6/2007 | Savage | F21V 15/01 362/101 |
| 2015/0159817 | A1 * | 6/2015 | Olsson | F21K 9/90 362/294 |
| 2020/0149697 | A1 * | 5/2020 | de Samber | F21S 41/143 |
| 2021/0215308 | A1 * | 7/2021 | Caprara | F21V 13/04 |

OTHER PUBLICATIONS

IPO; Combined Search and Examination Report under Sections 17 & 18(3) for Great British Patent Application No. GB2203939.0 dated Aug. 17, 2022, 2 pages.

* cited by examiner

*Primary Examiner* — Tracie Y Green
*Assistant Examiner* — Michael Chiang
(74) *Attorney, Agent, or Firm* — NK Patent Law

(57) ABSTRACT

A through-hull light for a marine vessel is provided. The light includes a body for mounting on the outer surface of a hull, having an outer side facing water and an inner side for mounting against the hull; a chamber formed within the body having a transparent screen mounted at an outer side; a shaft for extending from the inner side through an aperture in the hull; LEDs mounted within the chamber in parallel rows and arranged to be horizontal when the light is mounted through the hull, with each LED mounted to direct light out of the chamber in a first direction perpendicular to the inner side; a reflecting structure within the chamber having a plurality of reflectors positioned above or below a row of LEDS and parallel therewith, with each reflector formed to reflect light away at a fixed angle vertically from the first direction.

8 Claims, 8 Drawing Sheets

THROUGH-HULL LIGHT

CROSS-REFERENCE TO RELATED APPLICATIONS

This application claims priority to Great Britain Patent Application No. GB2203939.0, filed on Mar. 21, 2022, the entire contents of which is hereby incorporated by reference.

FIELD OF THE INVENTION

The present invention relates to underwater lighting, particular underwater lighting intended for mounting through the hulls of marine vessels below the water line to illuminate the surrounding water.

BACKGROUND TO THE INVENTION

Many marine vessels, including boats, ships, and yachts, are provided with underwater exterior lighting in their hull. This lighting acts to illuminate the water around the vessel and can provide a pleasing aesthetic appearance. Underwater lighting can also be useful for pleasure fishing vessels. Some underwater lights, particularly smaller lights, are fixed directly to the hull of a marine vessel. Many larger underwater lights are mounted within cofferdams formed in the hull of the vessel.

Very small underwater lights can be entirely external to a hull and fixed thereto. Slightly larger lights are often mounted through the hull, without a cofferdam. In particular, such underwater lights have shafts that extend through an aperture formed in the hull and a mounting portion formed at an outer end of the shaft for mounting to the hull, thereby sealing the aperture. One or more lights are generally mounted at or near the outer end of the shaft for projecting light outwards from the hull. The outer end of through hull lights are generally mounted to be as flat to the outer wall of the hull in order to avoid producing unnecessary drag.

As will be readily understood the port and starboard walls of the hulls of marine vessels are generally sloped away from vertical below the water line to ensure the vessel is suitably hydrodynamic. As a result, through hull underwater lights mounted through a port or starboard wall are generally downwardly oriented. Preferably light is directed horizontally outwards from the hull, or perhaps even upwards, towards the surface of the water. This is difficult, if not impossible, with current through hull underwater lights. Presently this can only be achieved by either mounting the lights within the shaft of the light or by having a large and bulky outer portion of the light external to the hull. Neither of these solutions are ideal. It is generally preferred to minimise the size of the shaft of the light to minimise the size of the aperture provided in the hull so mounting the lights within the shaft is not preferred. Similarly, as set out above, it is preferable that the size of any light mounted on an outer wall of a hull is minimised in order to avoid the light being easily damaged and in order to minimise unnecessary drag.

In light of the above there is a need for an improved through-hull light for a marine vessel that can direct light upwards whilst having a compact shaft and slimline outer portion.

SUMMARY OF THE INVENTION

The present invention provides a through-hull light for a marine vessel, the light comprising: a body for mounting on the outer surface of a hull, having an outer side for facing water and a flat inner side for mounting against the hull;

a chamber formed within the body having a transparent screen mounted at an outer side; a shaft extending from the inner side of the body for extending through an aperture formed in the hull;

a plurality of LEDs mounted within the chamber in two or more rows that are parallel with one another and arranged to be horizontal when the light is mounted through the hull of a marine vessel;

each LED mounted to direct light straight out of the chamber in a first direction perpendicular to the flat inner side of the body;

a reflecting structure mounted within the chamber, the reflecting structure comprising a plurality of reflectors, each reflector positioned immediately above or immediately below a row of LEDS and parallel therewith; wherein:

each reflector is formed to reflect light from the lights away from the first direction to a second direction that is a first fixed angle vertically from the first direction when the light is mounted through the hull of a marine vessel.

The present invention is advantageous in that it provides a simple construction in which a through-hull light can be formed with the light from the through-hull light directed upwards a first fixed angle vertically upwards away from a direction directly outwards from the portion of the hull. As will be readily understood, when mounted to against a hull the first direction will be generally perpendicular to the portion of hull where the through-hull light is mounted.

If the portion of hull is a lower portion of the hull, for example significantly below the waterline, then the first direction will be directed downwards from horizontal. The reflectors can then direct the light upwards from the first direction to the second direction, towards or above the horizontal providing an improved illumination. As the LEDs are contained within the body of the light the size of the shaft can be minimised, thereby minimising the size of the aperture that needs to be formed in the hull of the marine vessel. Further, the use of reflectors positioned above and below rows of LEDs allows the depth of the body to be minimised, allowing a through-hull light according to the present invention to have a low profile.

When mounted through the hull of a marine vessel the two or more rows of LEDs will be mounted to be horizontal such that the reflectors that are parallel to the to the rows of LEDs and are also mounted to be horizontal.

Each row of LEDs is mounted to direct light straight out of the chamber in a first direction perpendicular to the flat inner side of the body. This may be achieved in any manner apparent to the person skilled in the art. In embodiments of the invention the LEDs will be mounted on a board that is mounted parallel with the flat inner side of the body. In such embodiments the board may be immediately adjacent the flat inner side of the body, the board may form the flat inner side of the body, or there may be one or more components positioned between the board and the flat inner side of the body.

Each reflector is positioned either immediately above or below a row of LEDs. The reflectors may be formed in any matter apparent to the person skilled in the art. Each reflector positioned immediately above a row of LEDs will be angled in a first orientation to direct light incident upon it from the LEDs immediately below the reflector. Each reflector positioned immediately below a row of LEDs will be angled in a second direction to direct light incident upon it from the LEDs immediately below the reflector. That is, as all of the reflectors are formed to direct the light upwards from the first direction to the second direction the reflectors positioned immediately above the row of the LEDs are formed in a different manner to the reflectors positioned immediately below the row of the LEDs.

The through-hull light comprises a plurality of LEDs in at least two separate horizontal rows. Each row will comprise two or more LEDs. The light may have more than two separate horizontal rows. The number of LEDs and the number of rows provided will be dependent upon the type and power of the LEDs and the required output of the light. The LEDs may all be the same colour and/or the same power. Alternatively, LEDs of two or more colours may be provided and/or LEDs of varying power may be provided.

The first fixed angle may be any suitable angle that can be achieved through reflection of the light emitted from the plurality of LEDs by the reflectors. In embodiments of the invention the first fixed angle may be between 10° and 30°, for example between 10° and 20° or between 20° and 30° or between 10° and 15° or between 15° and 20° or between 20° and 25° or between 25° and 30°. This may be achieved by forming the reflectors to have reflecting faces oriented in any suitable manner Reflecting faces of the reflectors may be curved, flat, faceted, or formed in any other appropriate manner. In embodiments of the invention one or more reflectors may be a separate component that are fixed to the front face of a board on which the LEDs are mounted or otherwise held in an appropriate position within the through-hull light. In some embodiments all the reflectors are separate components. In alternative embodiments one or more of the reflectors may be formed as part of a unitary reflecting component mounted around the rows of LEDs and behind the transparent screen. In embodiments of the invention all of the reflectors may be formed as part of a unitary reflecting component.

In embodiments of the invention in which it is desirable to divert the lights from the LEDs through a greater angle it may be advantageous that the through-hull light further comprises a light redirecting film is positioned in front of the plurality of LEDs adjacent the transparent screen; wherein the light redirecting film is formed and oriented to divert light away from the second direction to a third direction that is a second fixed angle vertically upwards from the second direction when the light is mounted through the hull of a marine vessel; and the second fixed angle is between 1° and 20°. Suitable light directing films will be apparent to the person skilled in the art. Any suitable light redirecting film can be used with the through-hull light of the present invention. The combination of light redirecting film with the reflectors allows light from the LEDs to be redirected through angles greater than when only reflectors are utilised. A light redirecting film may be positioned between the transparent screen and the plurality of LEDs and preferably between the transparent screen and the reflectors.

Preferably a light redirecting film is adjacent the transparent screen and within the chamber i.e. positioned adjacent an inner side of the transparent screen. Alternatively a light redirecting film may be affixed to an outer side of the transparent screen. Alternatively or additionally the transparent screen may be integrally formed with a light redirecting film. The transparent screen may be formed to redirect light in an appropriate manner.

The second fixed angle may be any suitable angle that can be achieved using a light redirecting film. In embodiments of the invention the second fixed angle may be between 5° and 20°, between 5° and 10°, between 10° and 15°, between 15° and 20°, between 5° and 15°, or between 10° and 20°.

The through-hull light may have any other component suitable for use in through-hull lights. For example, the through-hull light may comprise a heat sink formed in the body or the shaft. It may also comprise suitable drivers for the LED lights.

Further features of the invention will be apparent from the preferred embodiments of the invention shown in the drawings and discussed below. Unless otherwise indicated by the claims or description any feature shown in the drawings may be included in any embodiment of the invention independently

DRAWINGS

Figure 1:
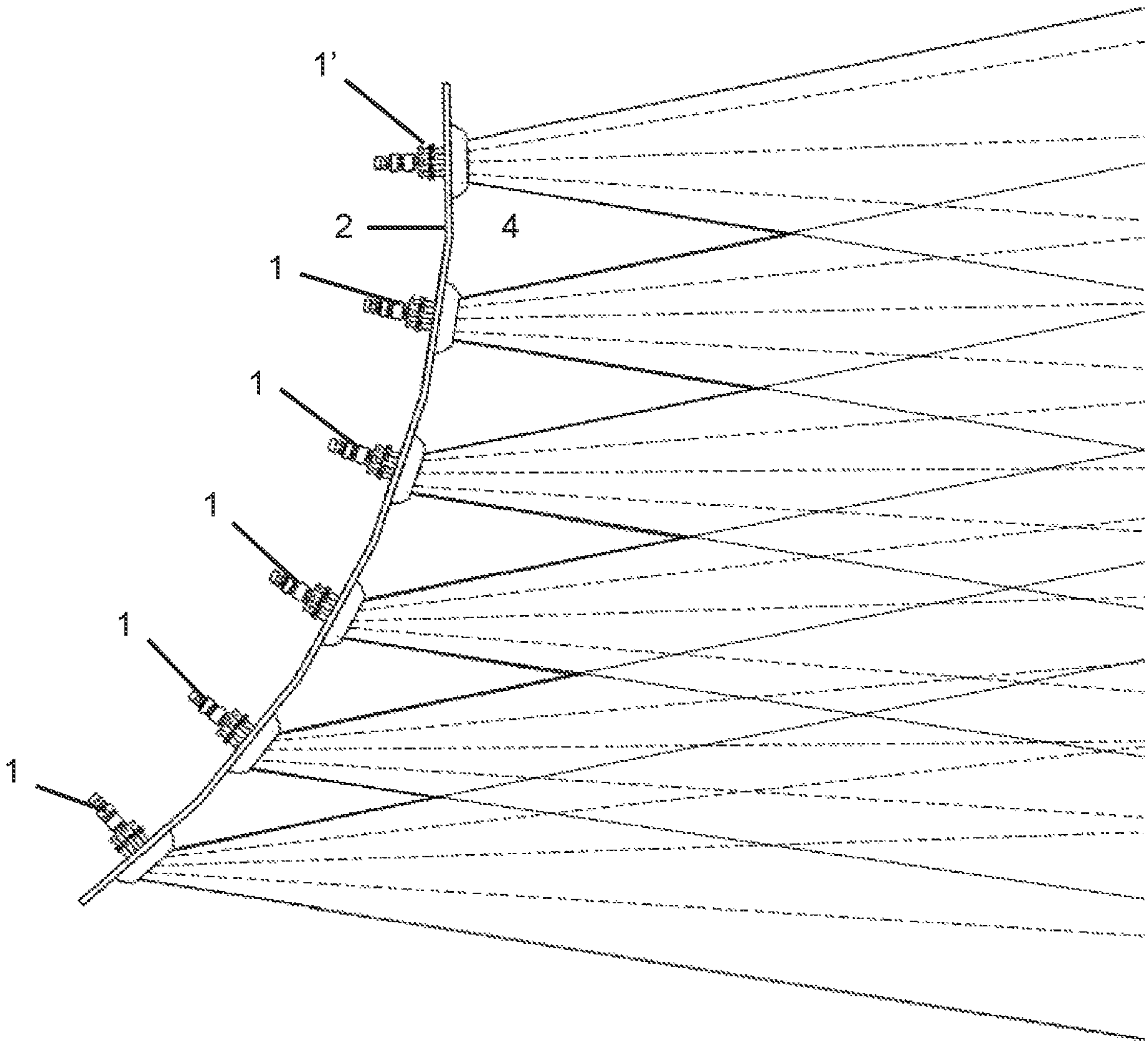
FIG. 1 is a schematic drawing illustrating five different through hull-lights according to the present invention and a through-hull light according to the prior art.

The positioning of six through-hull lights 1, 1' through a hull 2 of a marine vessel are shown in FIG. 1. The through-hull lights 1, 1' are positioned at different heights of the hull 2 such that they face outwards at a different angle to the vertical. Each through hull light 1, 1' comprises a body 3 for mounting on the outer surface of a hull 2, having an outer side for facing water 4 and a flat inner side for mounting against the hull 2, and a shaft 5 extending from the inner side of the body 3 for extending through an aperture formed in the hull 2. As can be seen in FIG. 1, the shafts extend inwards in a direction perpendicular to the section of hull 2 at which the through-hull light 1, 1' is mounted. The uppermost through-hull light 1', which is a through-hull light according to the prior art is mounted at a vertical section of hull 2 and so directs light horizontally outwards from the hull. There is no need for any light redirection from this through-hull light 1'.

The five lower through-hull lights 1 are lights according to the present invention. Each is mounted at a section of hull that is angled away from the vertical and thus, if their light was not redirected would project light in a direction below the horizontal. All five of these through-hull lights 1 are lights according to the present invention and thus their light is redirected to be substantially horizontal. That is, the five lower through-hull lights 1 include light redirection means (discussed below) that act to redirect light so that it is emitted in substantially the same direction as the uppermost through-hull light 1' according to the prior art. In particular, the lowermost light 1 includes light redirecting means to redirect the light through 50°, the lights above that light include redirecting means to redirect the light through 40°, 30°, 20°, and 10° respectively.

Figure 2:
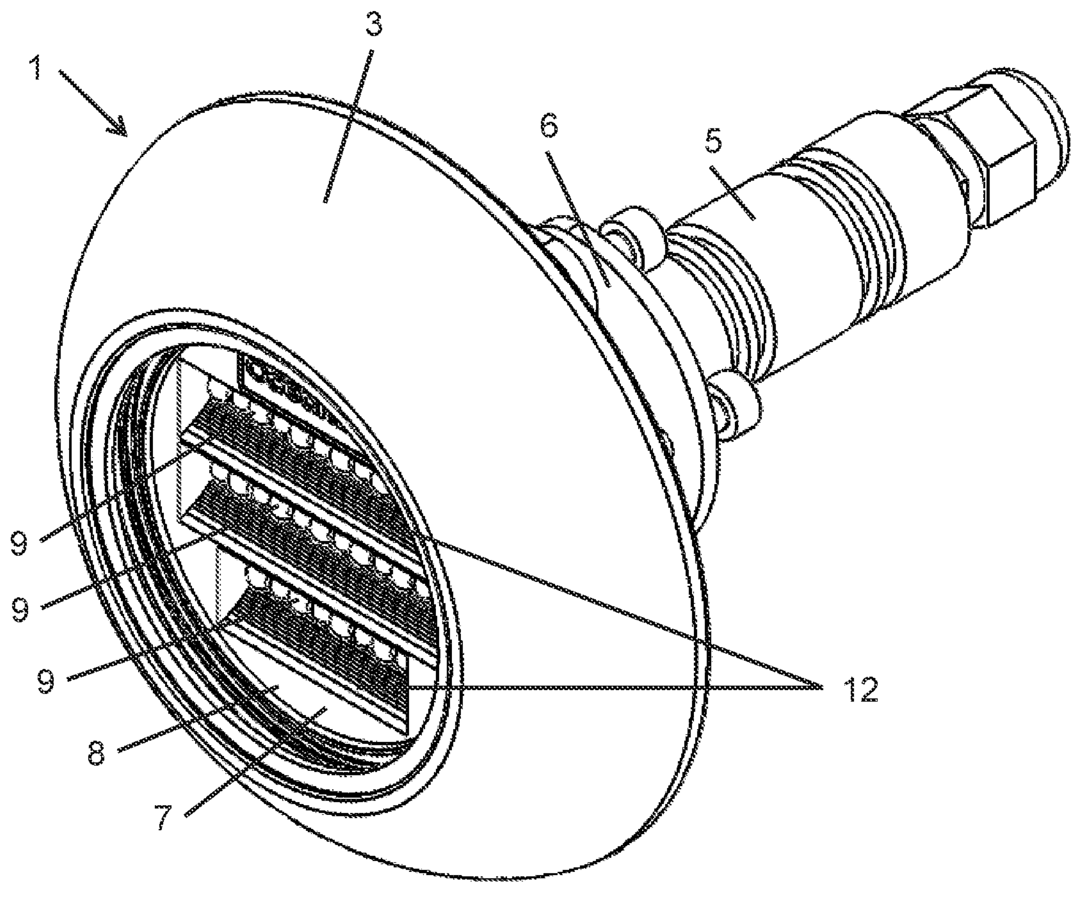
FIG. 2 is a first isometric image of a first embodiment of a through-hull light according to the present invention.
Figure 3:
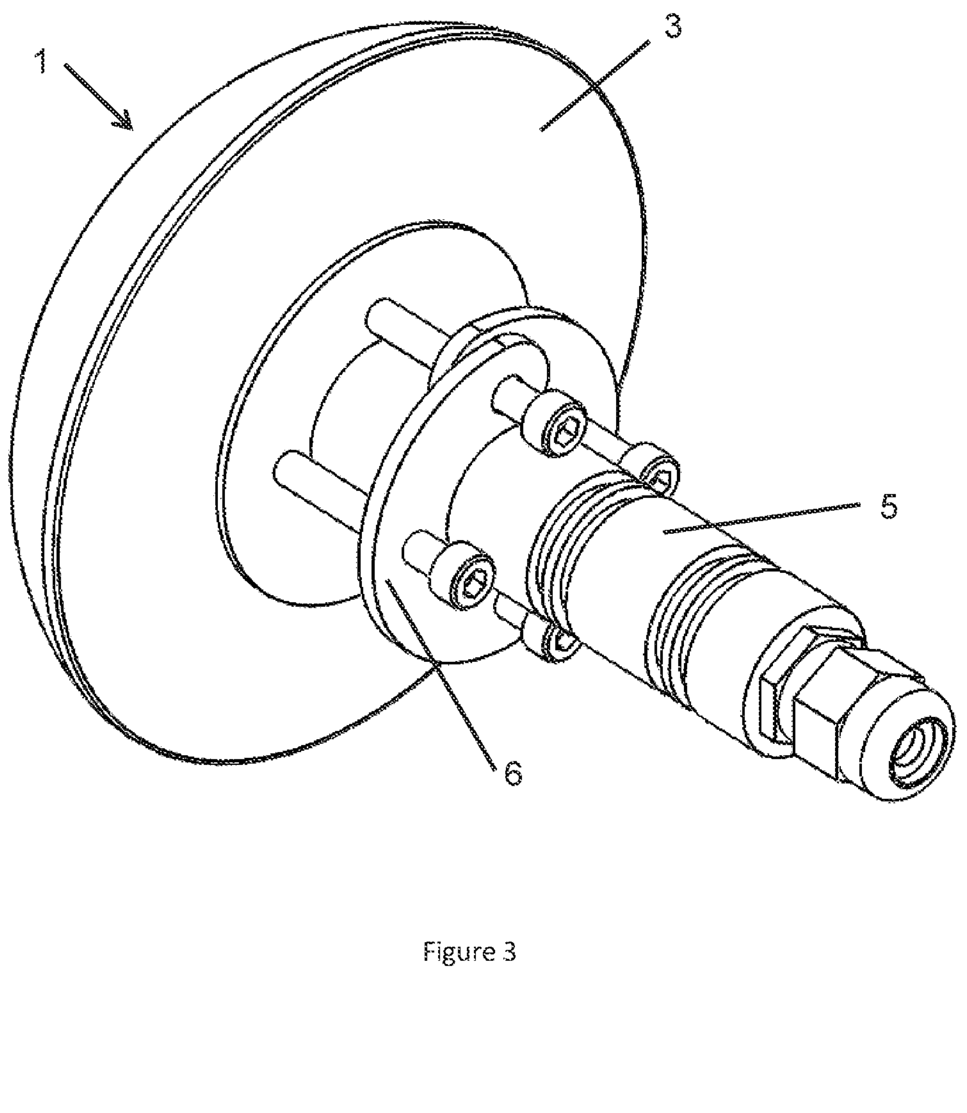
FIG. 3 is a second isometric image of the first embodiment of the through-hull light of FIG. 2.
Figure 4:
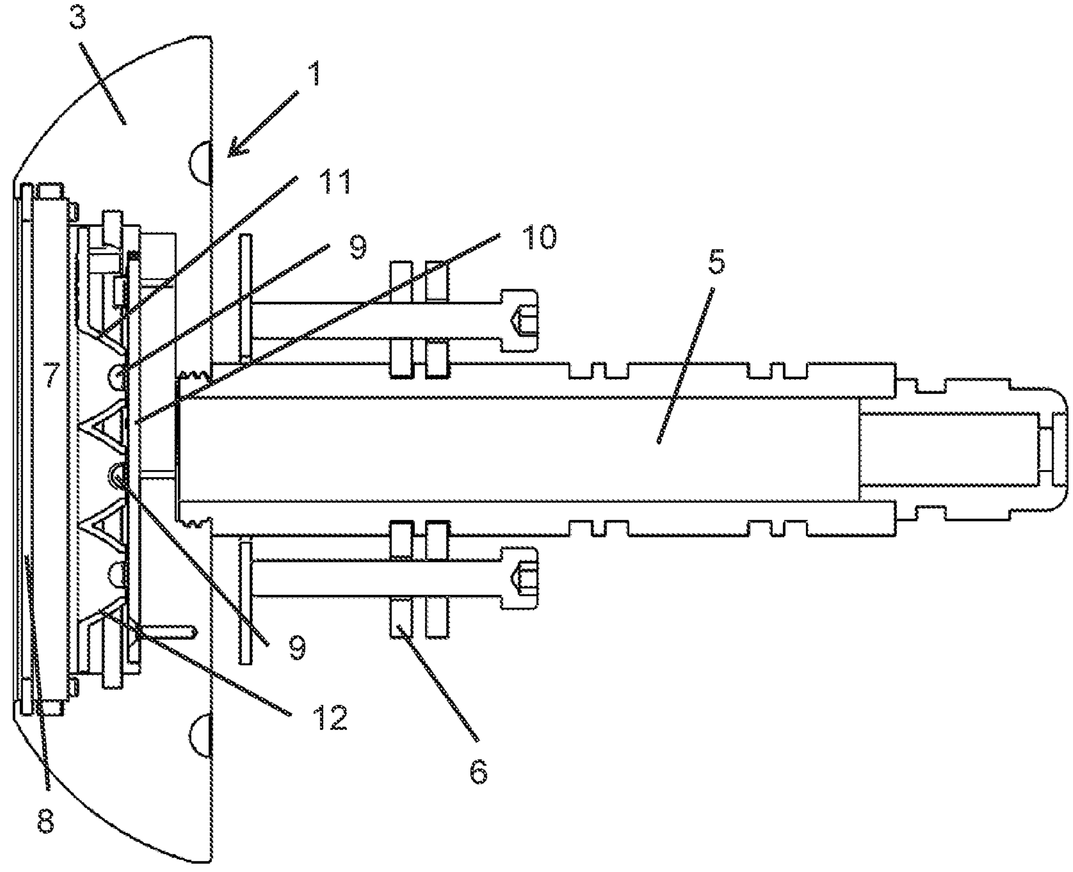
FIG. 4 is a cross-section through the first embodiment of the through-hull light shown in FIGS. 2 and 3.

A first embodiment of a through-hull light 1 according to the present invention is shown in FIGS. 2 to 4. The light 1 comprises a comprises a body 3 for mounting on the outer surface of a hull 2, having an outer side for facing water and a flat inner side for mounting against the hull 2, and a shaft 5 extending from the inner side of the body 3 for extending through an aperture formed in the hull 2. A clamping member 6 for clamping the light in position is also provided. A chamber 7 is formed within the body 3. A transparent screen 8 is mounted at an outer side of the chamber 7. A plurality of LEDs 9 are mounted within the chamber 7 on a front face of a printed circuit board 10. The LEDs 9 are mounted in parallel horizontal rows, each row vertically spaced apart from the others. Each LED 9 is mounted to direct light straight out of the chamber 7 in a first direction perpendicular to a flat inner side of the body 3.

An upper reflector 11 is positioned immediately above each row of LEDs 9. A lower reflector 12 is positioned immediately below each row of LEDs 9. The upper and lower reflectors 11, 12 are formed within as part of a unitary reflecting component 13, as shown in FIG. 7. The upper and lower reflectors 11, 12 are angled to reflect the light emitted by the adjacent row of LEDs 9 upwards through a first fixed angle. In the embodiments of FIGS. 2 to 6 the first fixed angle is 10°. As will be readily understood and is explained below in more detail the shape of the upper reflectors 11 will differ from the shape of the lower reflectors 12 in order to direct the light appropriately.

Figure 5:
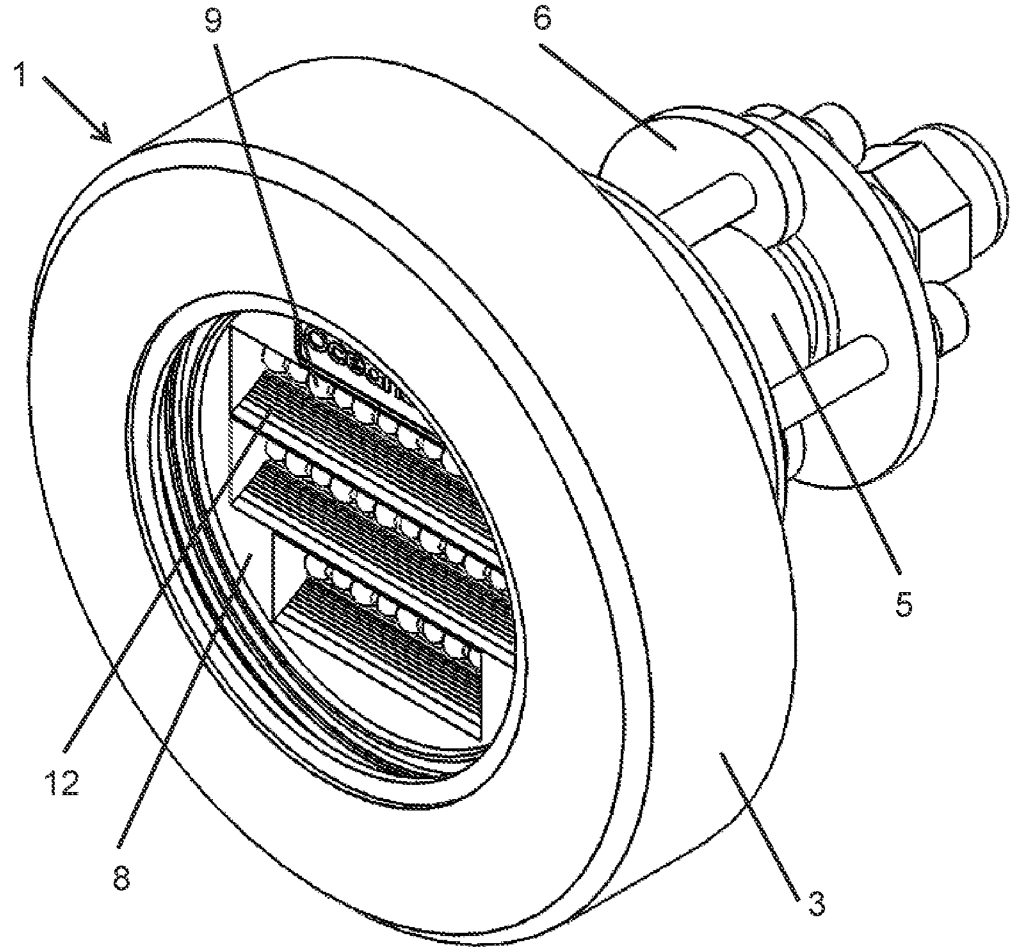
FIG. 5 is a first isometric image of a second embodiment of a through-hull light according to the present invention.
Figure 6:
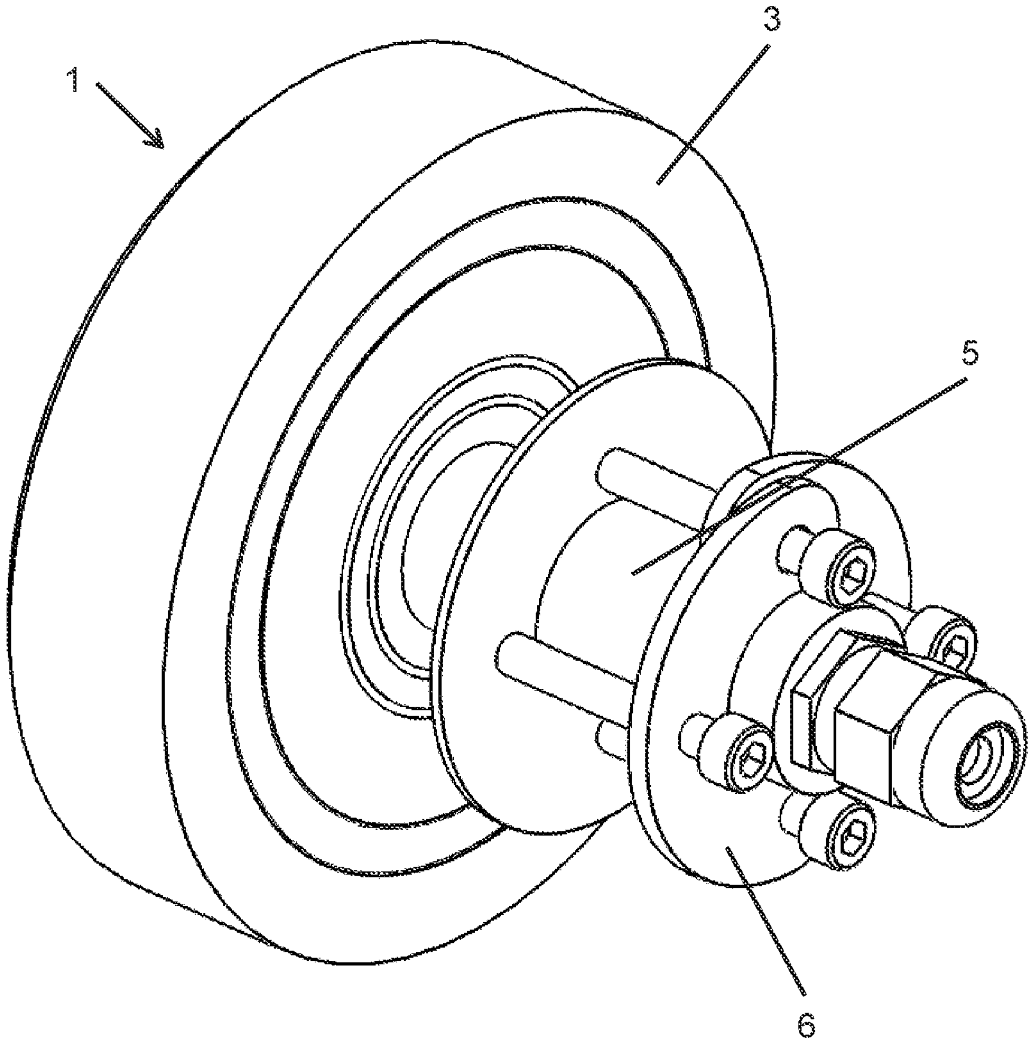
FIG. 6 is a second isometric image of the second embodiment of a through-hull light according to the present invention.
Figure 7:
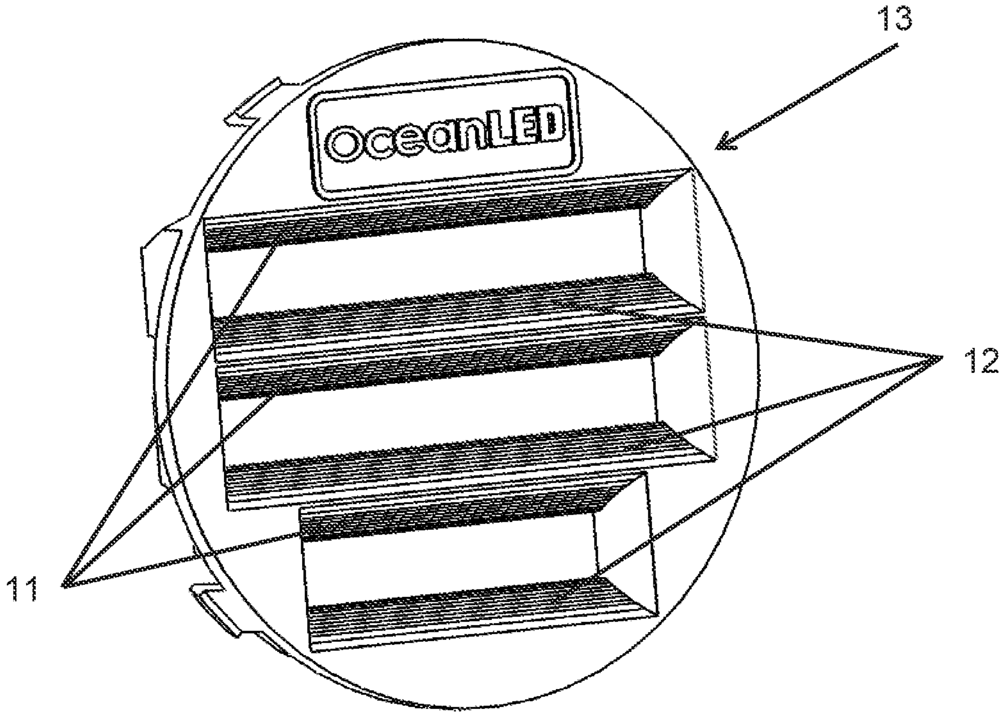
FIG. 7 shows a unitary moulded component of the first and second embodiments of the through-hull light.

A second embodiment of a through-hull light 1 according to the present invention is shown in FIGS. 5 and 6. The second embodiment is substantially the same as the first embodiment with the exception that the shape of the body 3 is cylindrical and thicker than in the body 3 of the first embodiment. Otherwise, the second embodiment of the invention has all of the same features as the first embodiment and the same reference numerals have been used for the features of the second embodiment.

Figure 8:
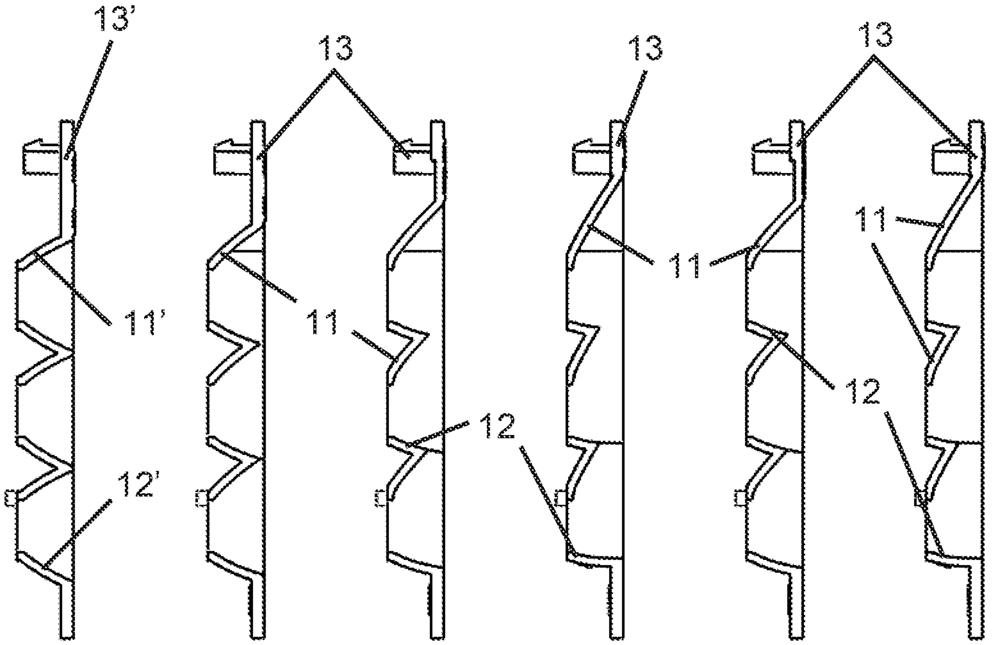
FIG. 8 shows the light redirecting components of six different embodiment of through-hull lights according to the present invention.

FIG. 8 shows a cross-section through a unitary reflecting component 13, 13' of the through-hull lights 1, 1' of FIG. 1. The unitary reflecting component 13' is according to the prior art in which upper and lower reflectors 11', 12' are at equal and opposite angles to reflect light from the LEDs 9 directly outwards from the light. The next three unitary reflecting components 13 are formed to reflect the light upwards through a first fixed angle of 10°, 20°, or 30° respectively. This is achieved by angling the upper and lower reflectors 11, 12 appropriately. The lower reflectors 12 are angled more steeply than the upper reflectors 11 and as a result and due to the limited space within the chamber 7 the reflecting faces of the upper reflectors 11 are larger than the reflecting faces of the lower reflectors 12.

In the two rightmost unitary reflecting components 13 of FIG. 8 a light redirecting film is provided in front of the unitary reflecting component 13. The light redirecting film is a film of transparent material that is formed and oriented to reflect light incident on an inner side upwards through a second fixed angle. In the embodiments shown in FIG. 8 the light redirecting film acts to redirect light through an angle of 20°. This allows the light from the LEDs 9 to be redirected upwards by up to 50°. In particular, the combination of the upper and lower reflectors 11, 12 and the light redirecting film shown in the Figures allows the light to be redirected by 40° or 50°. The right-most embodiment has a unitary reflecting component 13 that acts to redirect the light upwards by 30° and the light redirecting film directs the light upwards by a further 20°. The adjacent embodiment has a unitary reflecting component 13 that acts to redirect the light upwards by 20° and the light redirecting film directs the light upwards by a further 20°, thereby redirecting light from the LEDs upwards by 40°. Where provided, the light redirecting film is provided immediately adjacent an inner side of the transparent screen 8.

As will be readily understood, through-hull underwater lights 1 according to the present invention may comprise any component found in through-hull underwater lights according to the prior art. This includes, but is not limited, to waterproof seals, heat sinks, fixings, power supply cables, control panels, communication cables. For clarity, these features are not shown in the Figures or described above. It is believed that the position and operation of these features will be immediately apparent to the person skilled in the art.

What is claimed is:

1. A through-hull light for a marine vessel, the light comprising:

a body for mounting on the outer surface of a hull, having an outer side for facing water and a flat inner side for mounting against the hull;

a chamber formed within the body having a transparent screen mounted at an outer side;

a shaft extending from the inner side of the body for extending through an aperture formed in the hull;

a plurality of LEDs mounted within the chamber in two or more rows that are parallel with one another and arranged to be horizontal when the light is mounted through the hull of a marine vessel;

each LED mounted to direct light straight out of the chamber in a first direction perpendicular to the flat inner side of the body;

a reflecting structure mounted within the chamber, the reflecting structure comprising a plurality of reflectors, each reflector positioned immediately above or immediately below a row of LEDS and parallel therewith; wherein:

each reflector is formed to reflect light from the lights away from the first direction to a second direction that is a first fixed angle vertically from the first direction when the light is mounted through the hull of a marine vessel;

each reflector positioned immediately above a row of LEDs is angled in a first orientation to direct light incident upon it from the LEDs immediately below the reflector to the second direction; and each reflector positioned immediately below a row of LEDs is angled in a second orientation to direct light incident upon it from the LEDs immediately above the reflector to the second direction.

2. A through-hull light according to claim 1, wherein the first fixed angle is between 10° and 30°.

3. A through-hull light according to claim 2, wherein:

a light redirecting film is positioned in front of the plurality of LEDs adjacent the transparent screen; wherein the light redirecting film is formed and oriented to divert light away from the second direction to a third direction that is a second fixed angle vertically upwards from the second direction when the light is mounted through the hull of a marine vessel; and the second fixed angle is between 1° and 20°.

4. A through-hull light according to claim 3, wherein the light redirecting film is positioned between the LEDs and the transparent screen.

5. A through-hull light according to claim 3, wherein the second fixed angle is between 10° and 20°.

6. A through-hull light according to claim 1, wherein the reflectors consist of lower reflectors, positioned immediately below each row of LEDs, and upper reflectors, positioned immediately above each row of LEDs.

7. A through hull-light according to claim 1, wherein the reflectors are formed in a reflecting mount.

8. A through hull-light according to claim 1, wherein the plurality of LEDs are mounted on a PCB positioned within the chamber.

* * * * *